United States Patent
Jang (10) Patent No.: US 9,261,771 B2
(45) Date of Patent: Feb. 16, 2016

(54) DIGITAL PHOTOGRAPHING APPARATUS FOR DISPLAYING PANORAMIC IMAGES AND METHODS OF CONTROLLING THE SAME

(75) Inventor: Jae-young Jang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 13/551,045

(22) Filed: Jul. 17, 2012

(65) Prior Publication Data
US 2013/0050404 A1    Feb. 28, 2013

(30) Foreign Application Priority Data

Aug. 30, 2011    (KR) .................. 10-2011-0087193

(51) Int. Cl.
*H04N 5/222*    (2006.01)
*G03B 37/02*    (2006.01)
*H04N 5/232*    (2006.01)

(52) U.S. Cl.
CPC ............ *G03B 37/02* (2013.01); *H04N 5/23238* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 6,867,801 B1 | 3/2005 | Akasawa et al. | |
| 7,298,409 B1 * | 11/2007 | Misawa | 348/333.01 |
| 8,522,157 B2 * | 8/2013 | Park | 715/786 |
| 8,854,500 B2 * | 10/2014 | Ishida | 348/231.99 |
| 2005/0083426 A1 * | 4/2005 | Yoo et al. | 348/333.05 |
| 2012/0030634 A1 * | 2/2012 | Miyazaki | 715/863 |

FOREIGN PATENT DOCUMENTS

KR    10-0615988 B1    8/2006

* cited by examiner

*Primary Examiner* — Anthony J Daniels
(74) *Attorney, Agent, or Firm* — Drinker Biddle & Reath LLP (57) ABSTRACT

Digital photographing apparatus for displaying panoramic images and methods of controlling the digital photographing apparatus are disclosed. A digital photographing apparatus is provided that includes a digital signal processor to enlarge and display a panoramic image based on a target spot set in the panoramic image. Thus, a horizontal or vertical panoramic image may be more easily identified. In addition, a desired portion of the panoramic image may be set, and the panoramic image may be enlarged based on the desired portion, thereby improving satisfaction of a user.

18 Claims, 8 Drawing Sheets

<TOUCH SCREEN>

<MANIPULATION BUTTON>

<TOUCH SCREEN>     <MANIPULATION BUTTON>

<TOUCH SCREEN>

<MANIPULATION BUTTON>

FIG. 8

DIGITAL PHOTOGRAPHING APPARATUS FOR DISPLAYING PANORAMIC IMAGES AND METHODS OF CONTROLLING THE SAME

CROSS-REFERENCE TO RELATED PATENT APPLICATION

This application claims the priority benefit of Korean Patent Application No. 10-2011-0087193, filed on Aug. 30, 2011, in the Korean Intellectual Property Office, the entirety of which is incorporated herein by reference.

BACKGROUND

1. Field of the Invention

The invention relates to digital photographing apparatus for displaying panoramic images and methods of controlling the digital photographing apparatus.

2. Description of the Related Art

A digital photographing apparatus may include a panoramic photographing function for capturing an image with a larger field of view than is conventional. A panoramic image that is captured using the panoramic photographing function is horizontally and/or vertically longer than a conventional image. Thus, the panoramic image is typically displayed as image slides by automatically scrolling the panoramic image through key manipulation. However, it may take a long period of time to display a panoramic image and the entire panoramic image is shown regardless of the importance of subjects in the panoramic image.

SUMMARY

The invention provides digital photographing apparatus and methods of controlling the digital photographing apparatus by which panoramic images may be more easily identified by selectively enlarging and displaying the panoramic image.

According to an aspect of the invention, there is provided a digital photographing apparatus including a digital signal processor to enlarge and display a panoramic image based on a target spot set in the panoramic image.

The digital signal processor may enlarge the image in stages by as much as a size of a display unit for displaying the image.

The digital signal processor may receive a touch signal, and set the target spot according to the touch signal.

The digital signal processor may enlarge the image in stages by as many as a number of touchings of the target spot.

The digital signal processor may receive a signal corresponding to a predetermined button, and set the target spot according to the signal.

The digital signal processor may receive a manipulation signal while the image is enlarged, and adjust an enlarging speed according to the manipulation signal.

The digital signal processor may receive a target spot change signal while the image is enlarged, and display the image based on the target spot change signal.

The digital signal processor may display the image that is enlarged, and then display the entire panoramic image.

The digital signal processor may include a setting unit to set a default target spot in the image, and an enlarging unit to enlarge the image based on the target spot.

The digital photographing apparatus may further include a changing unit to generate a target spot change signal while the image is display, and output the target spot change signal to the enlarging unit.

The digital photographing apparatus may further include a speed adjusting unit to adjust an enlarging speed.

According to another aspect of the invention, there is provided a method of controlling a digital photographing apparatus, the method including receiving a target spot in a panoramic image, and enlarging and displaying the panoramic image based on the target spot.

The method may further include receiving a manipulation signal while the image is enlarged, and adjusting an enlarging speed according to the manipulation signal.

The method may further include receiving a target spot change signal while the image is enlarged, and displaying the image based on the changed target spot.

The method may further include displaying the image that is enlarged, and then displaying the entire panoramic image.

The method may further include enlarging the image in stages by as much as a size of a display unit for displaying the image.

The method may further include receiving a touch signal, and setting the target spot according to the touch signal.

The method may further include enlarging the image in stages by as many as a number of touchings of the target spot.

The method may further include receiving a signal corresponding to a predetermined button, and setting the target spot according to the signal.

BRIEF DESCRIPTION OF THE DRAWINGS

The above and other features and advantages of the invention will become more apparent in review of detail exemplary embodiments thereof with reference to the attached drawings, in which.

DETAILED DESCRIPTION

As the invention allows for various changes and numerous embodiments, particular embodiments are illustrated in the drawings and described in detail. However, the particular embodiments do not limit the invention to particular modes of practice, and it is to be appreciated that all changes, equivalents, and substitutes that do not depart from the spirit and technical scope of this disclosure are encompassed in the invention. In the description of the invention, certain detailed explanations may be omitted when it is deemed that they may unnecessarily obscure the essence of the invention.

The terms "first," "second," and the like, "primary," "secondary," and the like, as used herein do not denote any order, quantity, or importance, but rather are used to distinguish one element, region, component, layer, or section from another.

The terminology used herein is for the purpose of describing particular embodiments only and does not limit the invention. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

The invention will now be described more fully with reference to the accompanying drawings, in which exemplary embodiments of the invention are shown. In the drawings, the same or corresponding elements are denoted by the same reference numerals and a repeated explanation thereof will not be given.

Figure 1:
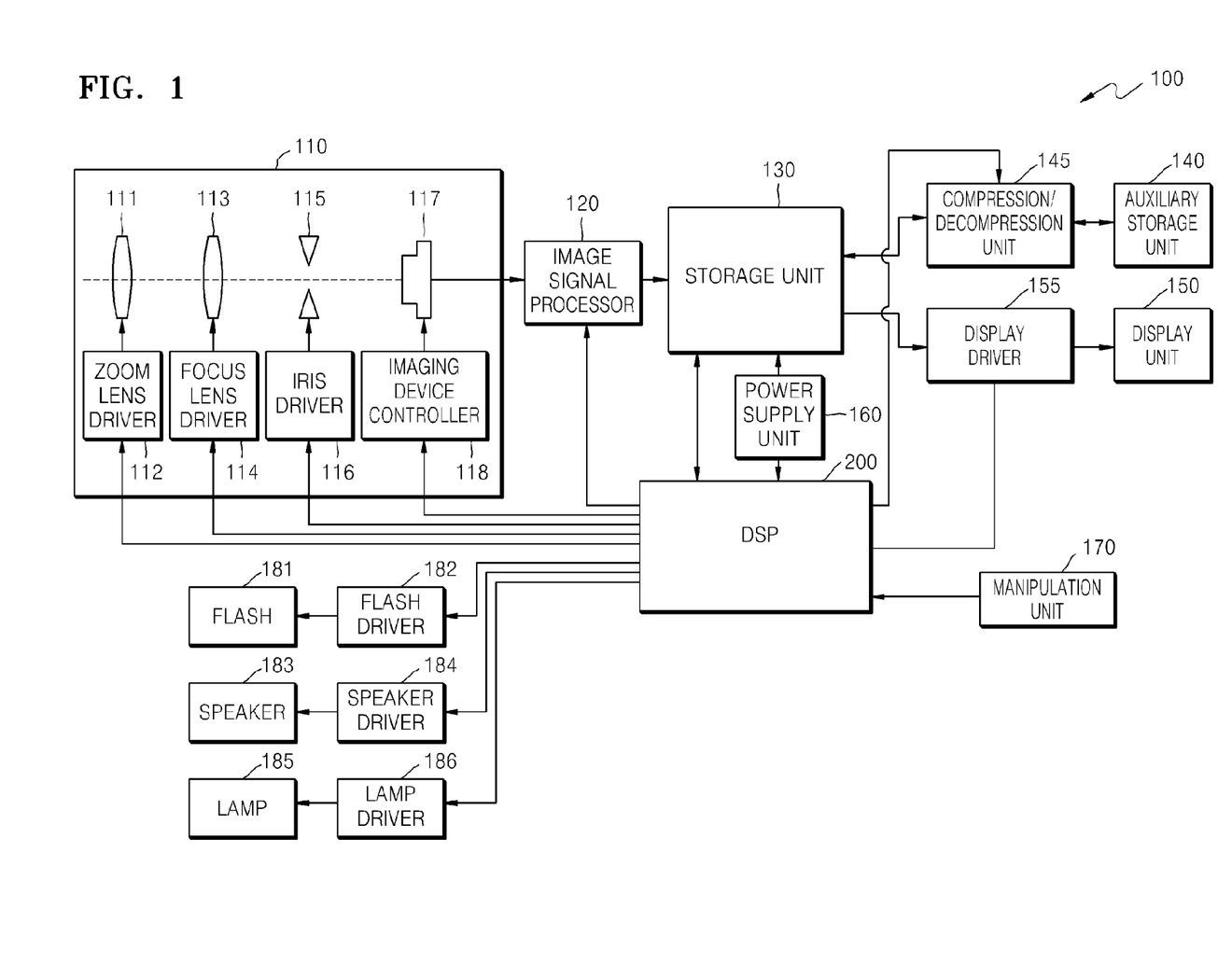
FIG. 1 is a block diagram of a digital photographing apparatus, according to an embodiment of the invention.

FIG. 1 is a block diagram of a digital photographing apparatus, according to an embodiment of the invention. A digital camera 100 will be explained as the digital photographing apparatus in the present embodiment. However, the digital photographing apparatus is not limited to being the digital camera 100 of FIG. 1, and various digital apparatus such as a digital single-lens reflex camera (DSLR), a hybrid camera, or the like may be the digital photographing apparatus. The configuration of the digital camera 100 will be described in detail according to an operation of the digital camera 100.

A process of photographing a subject will now be described. Light is transmitted from the subject through a zoom lens 111 and a focus lens 113, which are part of an optical system of an imaging unit 110. An amount of light is adjusted according to a degree of opening or closing of an iris 115, and the light forms an image of the subject on a receiving surface of an imaging device 117. The image formed on the receiving surface of the imaging device 117 is converted into an electrical image signal by photoelectric transformation.

The imaging device 117 may be a complementary metal-oxide semiconductor image sensor (CIS) or a charge-coupled device (CCD) that converts an optical signal into an electrical signal. The iris 115 may be opened during a normal state or when an auto focusing algorithm is executed according to a first release signal generated when a user presses a release button halfway, and may perform an exposure process after receiving a second release signal generated when the user completely presses the release button.

Positions of the zoom lens 111 and the focus lens 113 may be controlled by a zoom lens driver 112 and a focus lens driver 114, respectively. Examples of controlling the positions are when a wide angle-zoom signal is generated so that a focal length of the zoom lens 111 is reduced and a viewing angle is increased, and when a telephoto-zoom signal is generated so that the focal length of the zoom lens 111 is increased and the viewing angle is reduced. Since after the position of the zoom lens 111 is set, the position of the focus lens 113 is adjusted, the viewing angle is substantially unaffected by the position of the focus lens 113. Opening and closing of the iris 115 may be controlled by an iris driver 116. The sensitivity of the imaging device 117 may be controlled by an imaging device controller 118.

The zoom lens driver 112, the focus lens driver 114, the iris driver 116, and the imaging device controller 118 control the corresponding components according to calculation results of a digital signal processor (DSP) 200 based on exposure information, focal point information, or the like.

An image signal forming process will now be described. An image signal output from the imaging device 117 is output to an image signal processor 120. When the image signal input from the imaging device 117 to the image signal processor 120 is an analog signal, the image signal processor 120 converts the image signal into a digital image signal and performs various image processing processes on the image signal. The image signal is temporarily stored in a storage unit 130.

The image signal processor 120 may improve image quality by performing image signal processing processes such as auto white balance, auto exposure, gamma correction, and converting image data according to human sight to output an image signal having improved image quality. In addition, the image signal processor 120 may perform other image processing processes such as color filter array interpolation, color matrix, color correction, color enhancement, or the like.

The storage unit 130 may include a non-volatile program storage unit to store programs related to operations of the digital camera 100 regardless of the supply of power, and a volatile main storage unit to temporarily store image data and other data while power is supplied.

The program storage unit stores an operating program for operating the digital camera 100 and various application programs. In addition, the DSP 200 controls components according to programs stored in the program storage unit. According to the present embodiment, a program is stored in the program storage unit so that the components may operate under control of the DSP 200 to, when a predetermined target spot is set in a panoramic image, enlarge the panoramic image based on the target spot, and display the enlarged panoramic image.

The main storage unit temporarily stores image signals that are output from the image signal processor 120, an auxiliary storage unit 140, or the like.

A power supply unit 160 may be connected directly to the main storage unit independent of the supply of power that operates the digital camera 100. Thus, a program that is stored in the program storage unit to rapidly boot the digital camera 100 may be copied to the main storage unit and executed. In addition, when the digital camera 100 is booted again, data stored in the main storage unit may be rapidly read.

Image signals stored in the main storage unit may be output via a display driver 155, which converts the image signals into image signals suitable for display and output. Converted image signal may be displayed for a user on a display unit 150. The display unit 150 may serve as a viewfinder for consecutively displaying the image signals obtained by the imaging device 117 during a photographing mode to determine a photographing range. Various display apparatuses such as a liquid display device (LCD), an electrophoretic display device (EDD), or the like may be used as the display unit 150. Furthermore, the display unit 150 may include a touch screen so that user manipulation signals may be input via the touch screen and a manipulation unit 170.

A process of recording the image signal generated as described above will now be described. An image signal is temporarily stored in the storage unit 130. In this case, the image signal and various pieces of information related to the image signal are stored in the auxiliary storage unit 140. In addition, the image signal and the pieces of information are output to a compression/decompression unit 145. In the compression/decompression unit 145, a compression circuit applies a compression process such as JPEG compression to an image to form an image file requiring less storage memory than the original image signal. The compressed image file is stored in the auxiliary storage unit 140.

The auxiliary storage unit 140 may be a fixed-type semiconductor memory such as an external flash memory, a semiconductor memory such as a card-type flash memory that is detachable or removable from a device and has a card or stick shape, a magnetic recording medium such as a hard disc or a floppy disc, an optical recording medium, or the like.

A process of reproducing an image will now be described. The image file that is compressed and stored in the auxiliary storage unit 140 is output to the compression/decompression unit 145. A decompression process, that is, a decoding process is performed on the image file to extract an image signal from the image file. The decompressed image signal is output to the storage unit 130. The image signal may be temporarily stored in the storage unit 130, and may be reproduced on the display unit 150 through the display driver 155.

The digital camera 100 includes the manipulation unit 170 for receiving external user signals as an inputs. Examples of the manipulation unit 170 may include various functional buttons such as a shutter release button for opening and closing a shutter (not shown) to expose the imaging device 117 to light for a predetermined period of time, a power button that may be pressed to activate the power supply 160, a wide angle-zoom button and a telephoto-zoom button for increasing or reducing a viewing angle according to an input, a direction key for selecting character input, a photographing mode button, a reproduction mode button, a white balance setting button, and an exposure setting button.

The digital camera 100 may include a flash 181, and a flash driver 182 that drives the flash 181. The flash 181 is a light-emitting device that illuminates a subject when photographing is performed in a dark environment.

A speaker 183 and a lamp 185 may respectively output a sound signal and a light signal to indicate an operating state or the like of the digital camera 100. In particular, according to the present embodiment, if a photographing condition including a point of time for setting photographing variables and a point of time for photographing is changed in a manual mode, an alarm signal indicating this change may be provided as a sound or a light signal output through the speaker 183 or the lamp 185, respectively. The type or volume of the sound, or the like of the speaker 183 may be controlled by a speaker driver 184. A lamp driver 186 may control the lamp 185 to emit or not to emit light, a light-emitting period of the lamp 185, a type of light emission of the lamp 185, or the like.

The DSP 200 may perform calculation processes according to an operating system and an application system that are stored as programs in the storage unit 130, may temporarily store calculation results, and may control corresponding components according to the calculation results so as to operate the digital camera 100 as described above. In particular, according to the present embodiment, when a predetermined target spot is set in a panoramic image, the DSP 200 enlarges the image based on the target spot, and displays the enlarged image.

Hereinafter, the DSP 200 will be described in detail with reference to FIG. 2 through FIG. 5.

Figure 2:
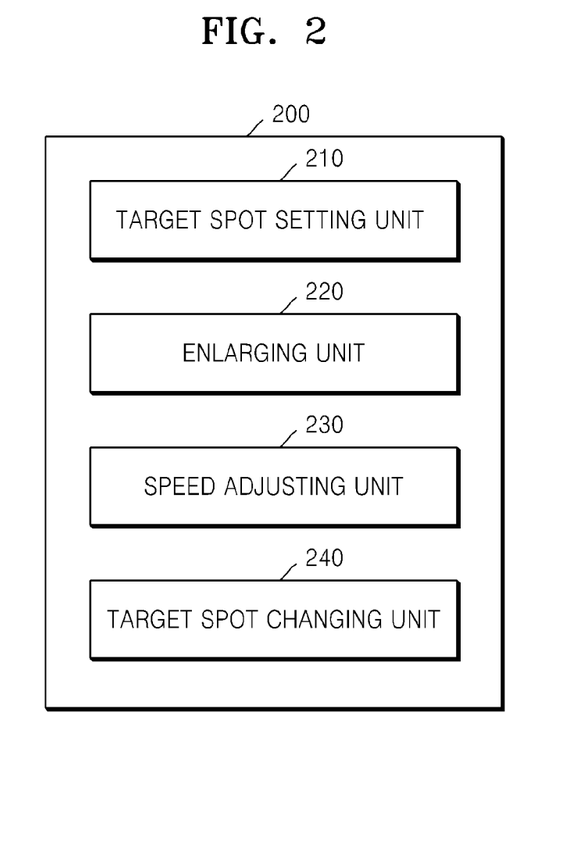
FIG. 2 is a detailed block diagram of the digital signal processor of FIG. 1, according to an embodiment of the invention.

FIG. 2 is a detailed block diagram of the DSP 200 of FIG. 1, according to an embodiment of the invention. The DSP 200 includes a target spot setting unit 210, an enlarging unit 220, a speed adjusting unit 230, and a target spot changing unit 240.

Figure 3A:
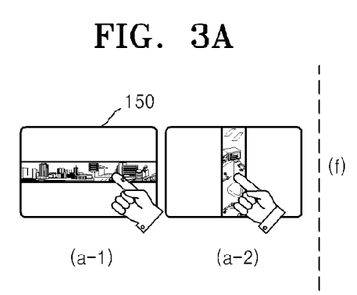
FIGS. 3A through 3J depict displaying of a panoramic image by the digital signal processor of FIG. 2, which enlarges and displays the image based on a target spot, according to an embodiment of the invention.

Referring to FIG. 2, the target spot setting unit 210 obtains a target spot in a panoramic image comprising at least two consecutive images. When an entire panormaic image with a horizontally long length (hereinafter, referred to as a horizontal panoramic image) or an image with a vertically long length (hereinafter, referred to as a vertical panoramic image) is displayed on the display unit 150, a height to width ratio may make it difficult to identify the image, as shown in FIG. 3A. In this case, the user may set, select or identify a desired target spot in the displayed panoramic image.

A target spot may be set by touching the display unit 150 including a touch screen. (a-1) of FIG. 3A shows a case where a target spot is set by touching a horizontal panoramic image. (a-2) of FIG. 3A shows a case where a target spot is set by touching a vertical panoramic image. A touch signal of the display unit 150 may be received by the target spot setting unit 210 to extract or determine corresponding coordinates, thereby obtaining a position of the target spot.

Figure 3B:
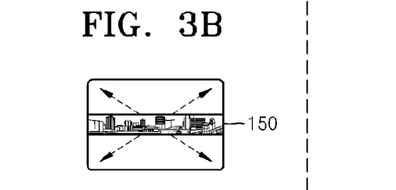
Figure 3C:
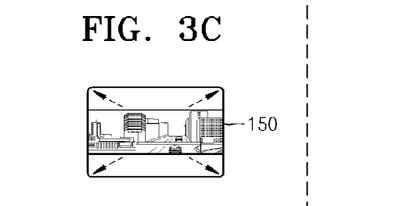
Figure 3D:
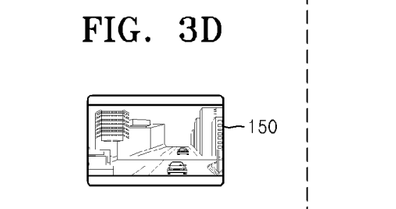
Figure 3E:
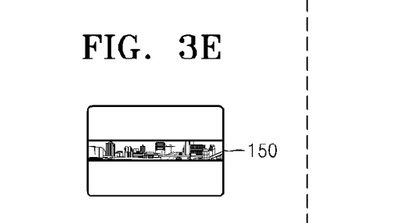
Figure 3F:
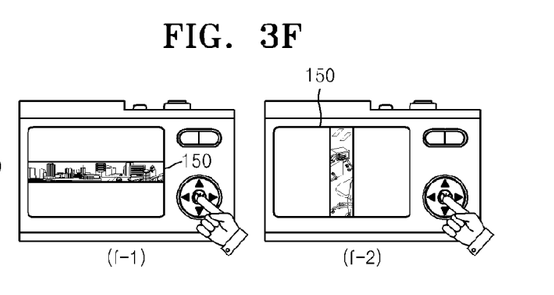

Additionally or alternatively, a target spot may be set by pressing a predetermined button (hereinafter, referred to as any one of a right, a left, an up, a down, and an OK button, for convenience of description) included in the manipulation unit 170. (f-1) of FIG. 3F shows a case where a target spot is set in a horizontal panoramic image by pressing the OK button. (f-2) of FIG. 3F shows a case where a target spot is set in a vertical panoramic image by pressing the OK button. In general, when the OK button is pressed, a target spot is set based on a center of the display unit 150. In this case, if the center is not a desired target spot of the user, the user may set, adjust, select or identify the target spot. For example, when the user presses the OK button twice, an active window or a pointer is displayed on the display unit 150. In this case, the target spot may be adjusted by moving the active window or the pointer to a desired target spot by pressing the right, the left, the up, the down, and the OK buttons, and then pressing the OK button again. A signal of a position of the active window or the pointer is received by the target spot setting unit 210, which extracts or obtains corresponding coordinates, thereby obtaining a position of the target spot.

The enlarging unit 220 enlarges an image based on the target spot received by the target spot setting unit 210 and displays the enlarged image. The enlarging unit 220 may automatically enlarge the image on the display unit 150 including a touch screen in stages and by as much as the size of the display unit 150, as shown in FIGS. 3B through 3D. In FIGS. 3B through 3D, an enlarging method includes three operations, for convenience of description, but may include three or more operations. With regard to a manual enlarging method, whenever the user touches the display unit 150, the image may be additionally enlarged. In this case, the image may be enlarged by as much as a size supported by the digital camera 100, which may exceed the size of the display unit 150.

Figure 3G:
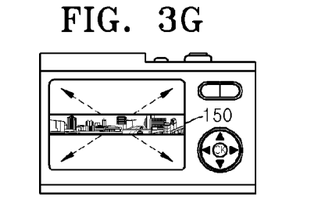
Figure 3H:
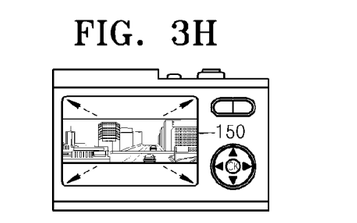
Figure 3I:
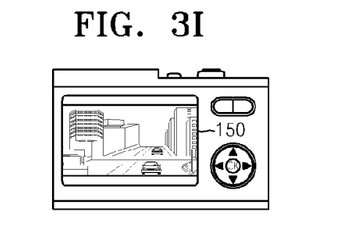
Figure 3J:
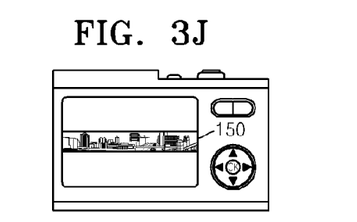

The enlarging unit 220 may automatically enlarge the image on the display unit 150 including a general screen in stages and by as much as the size of the display unit 150, as shown in FIGS. 3G through 3I. In FIGS. 3G through 3I, an enlarging method includes three operations, for convenience of description, but may include three or more operations. With regard to a manual enlarging method, whenever the user presses any one of the right, the left, the up, the down, and the OK buttons, the image may be additionally enlarged. In this case, the image may be enlarged by as much as a size supported by the digital camera 100, which may exceed the size of the display unit 150. When the enlarging method is completely performed, the entire panoramic image is displayed again, as shown in FIGS. 3E and 3J.

Figure 4A:
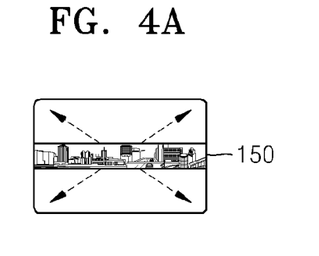
FIGS. 4A through 4H depict displaying of a panoramic image by the digital signal processor of FIG. 2, which adjusts an enlarging speed according to user settings, according to an embodiment of the invention.

The speed adjusting unit 230 receives an image adjusting speed and adjusts the image enlarging speed while or before an image is enlarged. FIGS. 4A and 4F show a case where an enlarging method is being performed.

Figure 4B:
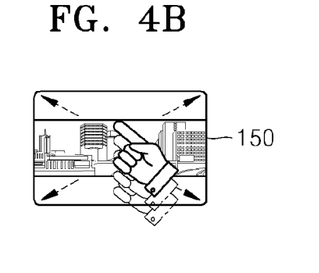

FIG. 4B shows a case where an enlarging speed is adjusted by performing up/down touches on the display unit 150 including a touch screen while an image is enlarged. FIG. 4B relates to a horizontal panoramic image. With regard to a vertical panoramic image, the enlarging speed may be adjusted by performing right/left touches.

FIG. 4F shows a case where an enlarging speed is adjusted by pressing the up/down buttons to automatically enlarge an image in stages on the display unit 150 including a general screen while the image is enlarged. FIG. 4F relates to a horizontal panoramic image. With regard to a vertical panoramic image, the enlarging speed may be adjusted by pressing the right/left buttons.

Figure 4C:
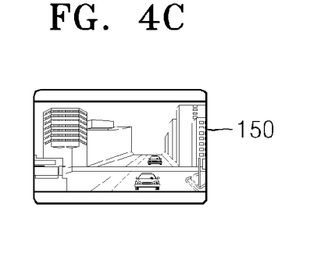
Figure 4D:
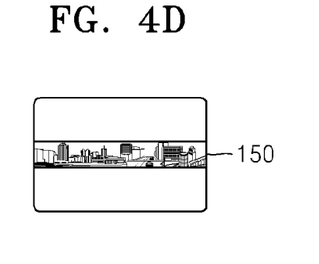
Figure 4E:
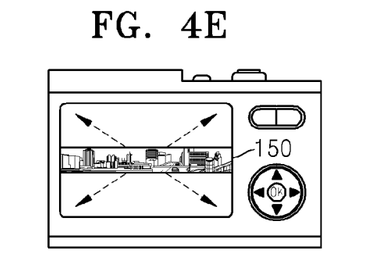
Figure 4F:
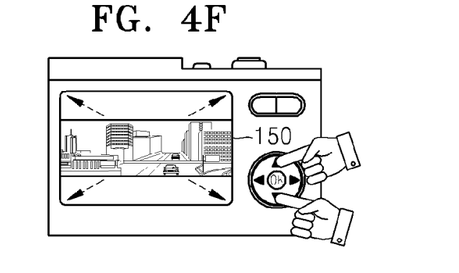
Figure 4G:
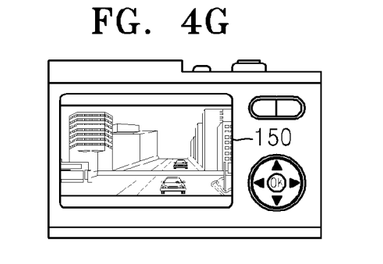
Figure 4H:
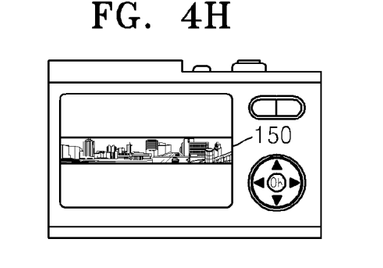

FIGS. 4C and 4G show a final image obtained by adjusting an image enlarging speed. When an image is completely enlarged, the entire panoramic image is displayed again, as shown in FIGS. 4D and 4H.

The target spot changing unit 240 generates a target spot change signal while or before an image is enlarged, and outputs the target spot change signal to the enlarging unit 220 so as to enlarge the image based on the changed target spot and to display the enlarged image.

Figure 5A:
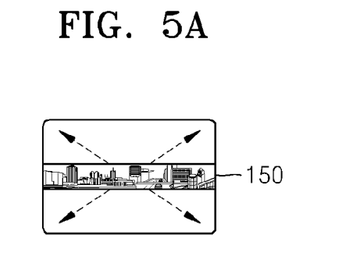
FIGS. 5A through 5H depict displaying of a panoramic image by the digital signal processor of FIG. 2, which enlarges and displays an image based on a changed target spot, according to an embodiment of the invention.
Figure 5B:
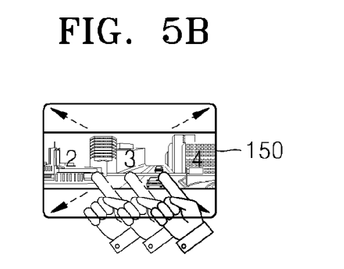

FIG. 5B shows a case where a target spot is set by performing right/left touch on a horizontal panoramic image. FIG. 5F shows a case where a target spot is set by pressing the right/left buttons for a horizontal panoramic image. With regard to a vertical panoramic image, a target spot may be set by performing up/down touches and/or by pressing the up/down buttons.

FIG. 5B shows a case where a user changes a target spot by performing right/left touches while an image is enlarged based on the target spot. FIG. 5F shows a case where a user changes a target spot by pressing the right/left buttons while an image is enlarged based on the target spot. With regard to a vertical panoramic image, a target spot may be changed by performing up/down touches and/or by pressing the up/down buttons.

Figure 5C:
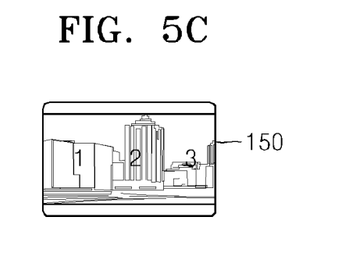
Figure 5D:
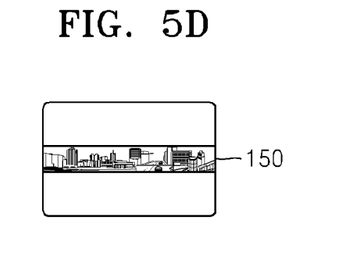
Figure 5E:
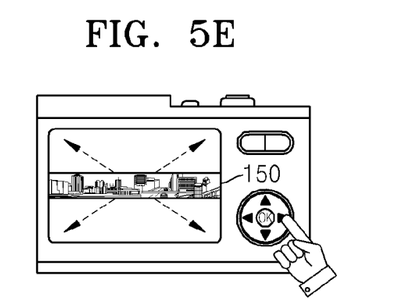
Figure 5F:
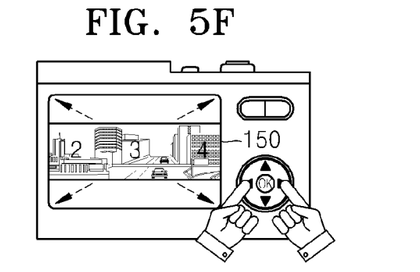
Figure 5G:
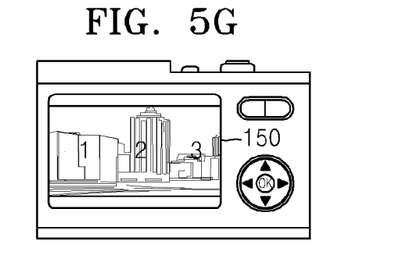
Figure 5H:
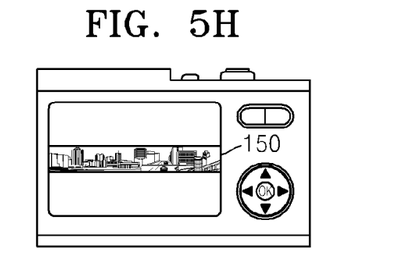

FIGS. 5C and 5G show a case where an image is enlarged based on the changed target spot. When an enlarging method is completely performed, the entire panoramic image is displayed again, as shown in FIGS. 5D and 5H.

Accordingly, when it is difficult to identify a horizontal or vertical panoramic image on the display unit 150, the panoramic image may be more easily identified by enlarging the panoramic image. In addition, a desired portion of the horizontal or vertical panoramic image may be set and the panoramic image enlarged based on the desired portion, thereby improving satisfaction of the user.

Methods of controlling digital photographing apparatus will now be described with reference to FIGS. 6 through 8.

Figure 6:
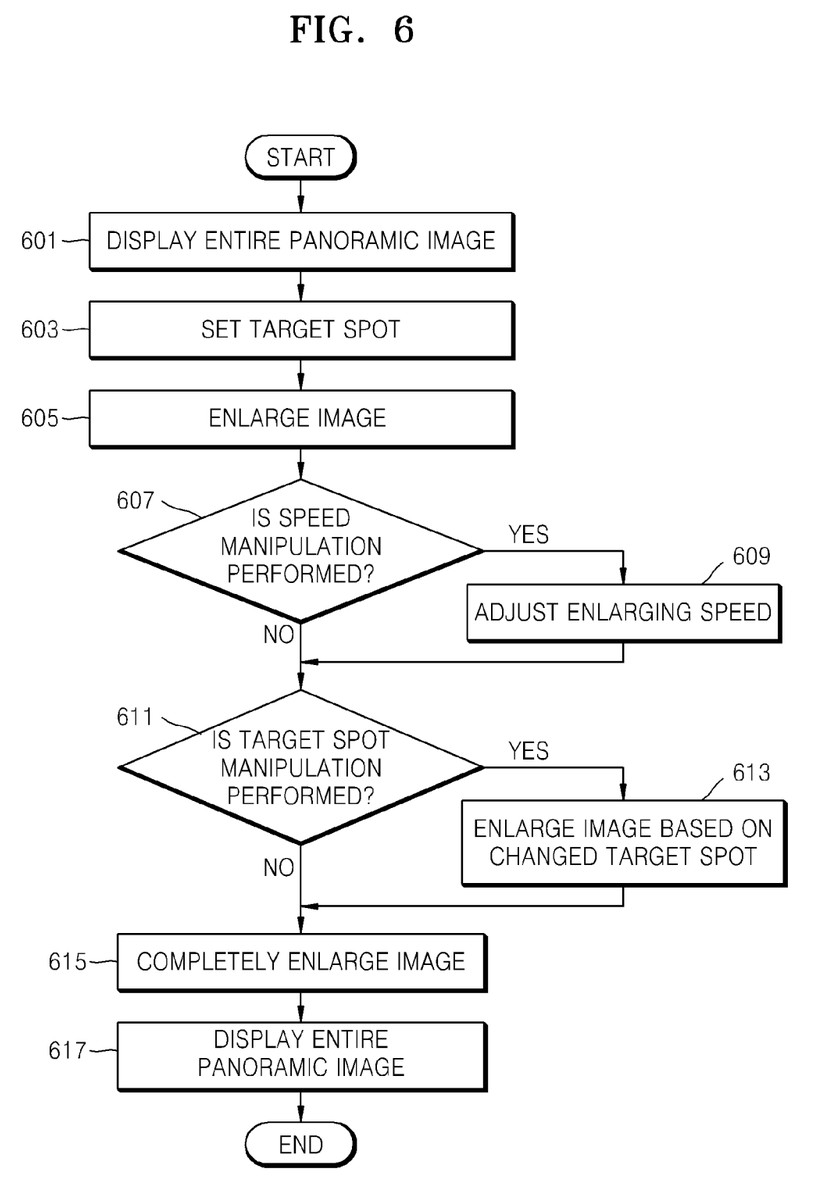
FIG. 6 is a flowchart of a method of controlling a digital photographing apparatus, according to an embodiment of the invention.

FIG. 6 is a flowchart of a method of controlling a digital photographing apparatus, according to an embodiment of the invention.

Referring to FIG. 6, the DSP 200 displays an entire panoramic image (operation 601). The panoramic image may be a horizontal or vertical panoramic image, as shown in (a-1) and (a-2) of FIG. 3A and (f-1) and (f-2) of FIG. 3F.

The DSP 200 receives a target spot setting signal that is input by a user (operation 603). The target spot setting signal may be a touch signal or a signal corresponding to any one of the up, the down, the right, the left and the OK buttons. Alternatively, DSP 200 sets the target spot to a default target spot such as a center of the panoramic image.

The DSP 200 enlarges the panoramic image based on the set target spot (operation 605). While the image is enlarged, the DSP 200 determines whether a speed manipulation signal is received (operation 607). When the speed manipulation signal is received, an image enlarging speed is adjusted (operation 609). With regard to a horizontal panoramic image, the image enlarging speed may be adjusted according to an up/down manipulation. With regard to a vertical panoramic image, the image enlarging speed may be adjusted according to a right/left manipulation. However, the present embodiment is not limited to these manipulations.

The DSP 200 determines whether a change target manipulation signal is received (operation 611). When the change target manipulation signal is received, the image is enlarged based on a changed target spot (operation 613). With regard to a horizontal panoramic image, the target spot may be changed according to a right/left manipulation. With regard to a vertical panoramic image, the image enlarging speed may be changed according to an up/down manipulation. However, the present embodiment is not limited to these manipulations.

The DSP 200 may completely enlarge the image at the changed image enlarging speed or based on the changed target spot (operation 615).

When the image is completely enlarged, the DSP 200 displays the entire panoramic image again (operation 617).

Figure 7:
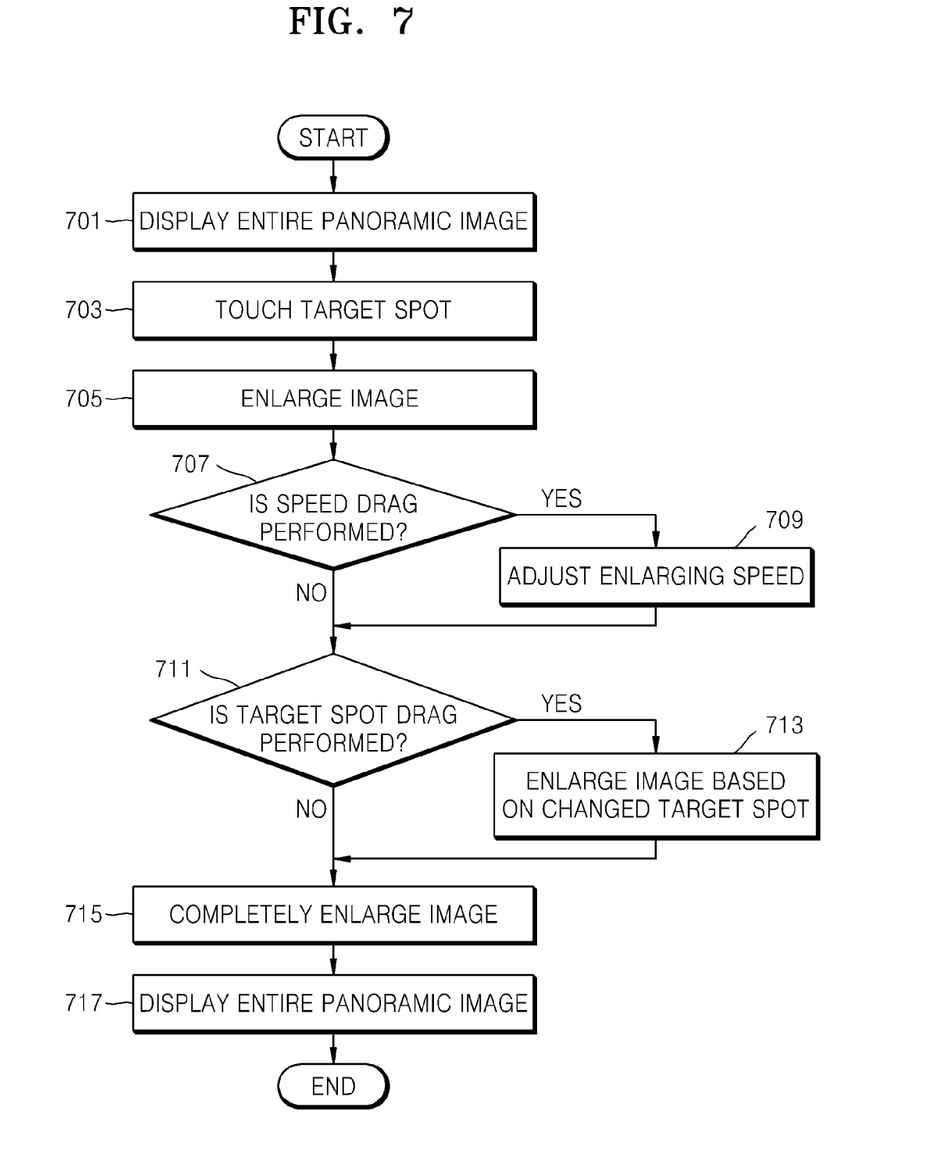
FIG. 7 is a flowchart of a method of controlling a digital photographing apparatus using a touch screen, according to another embodiment of the invention.

FIG. 7 is a flowchart of a method of controlling a digital photographing apparatus based on touches of a touch screen, according to another embodiment of the invention.

Referring to FIG. 7, the DSP 200 displays an entire panoramic image (operation 701). The panoramic image may be a horizontal or vertical panoramic image, as shown in (a-1) or (a-2) of FIG. 3A.

The DSP 200 receives a target spot setting signal formed by user's touch (operation 703). Alternatively, the DSP 200 sets the target spot to a default target spot such as a center of the panoramic image.

The DSP 200 enlarges the panoramic image based on the set target spot (operation 705). While the image is enlarged, the DSP 200 determines whether a speed manipulation drag touch is received (operation 707). When the speed manipulation drag touch is received, an image enlarging speed is adjusted (operation 709). With regard to a horizontal panoramic image, the image enlarging speed may be adjusted according to an up/down drag touch. With regard to a vertical panoramic image, the image enlarging speed may be adjusted according to a right/left drag touch. However, the present embodiment is not limited to these drag touches.

The DSP 200 determines whether a target spot drag touch is received (operation 711). When the target spot drag touch is received, the image is enlarged based on a changed target spot (operation 713). With regard to a horizontal panoramic image, the target spot may be changed according to a right/left drag touch. With regard to a vertical signal, the image enlarging speed may be changed according to an up/down drag touch. However, the present embodiment is not limited to these drag touches.

The DSP 200 may completely enlarge the image at the changed image enlarging speed or based on the changed target spot (operation 715).

When the image is completely enlarged, the DSP 200 displays the entire panoramic image again (operation 717).

Figure 8:
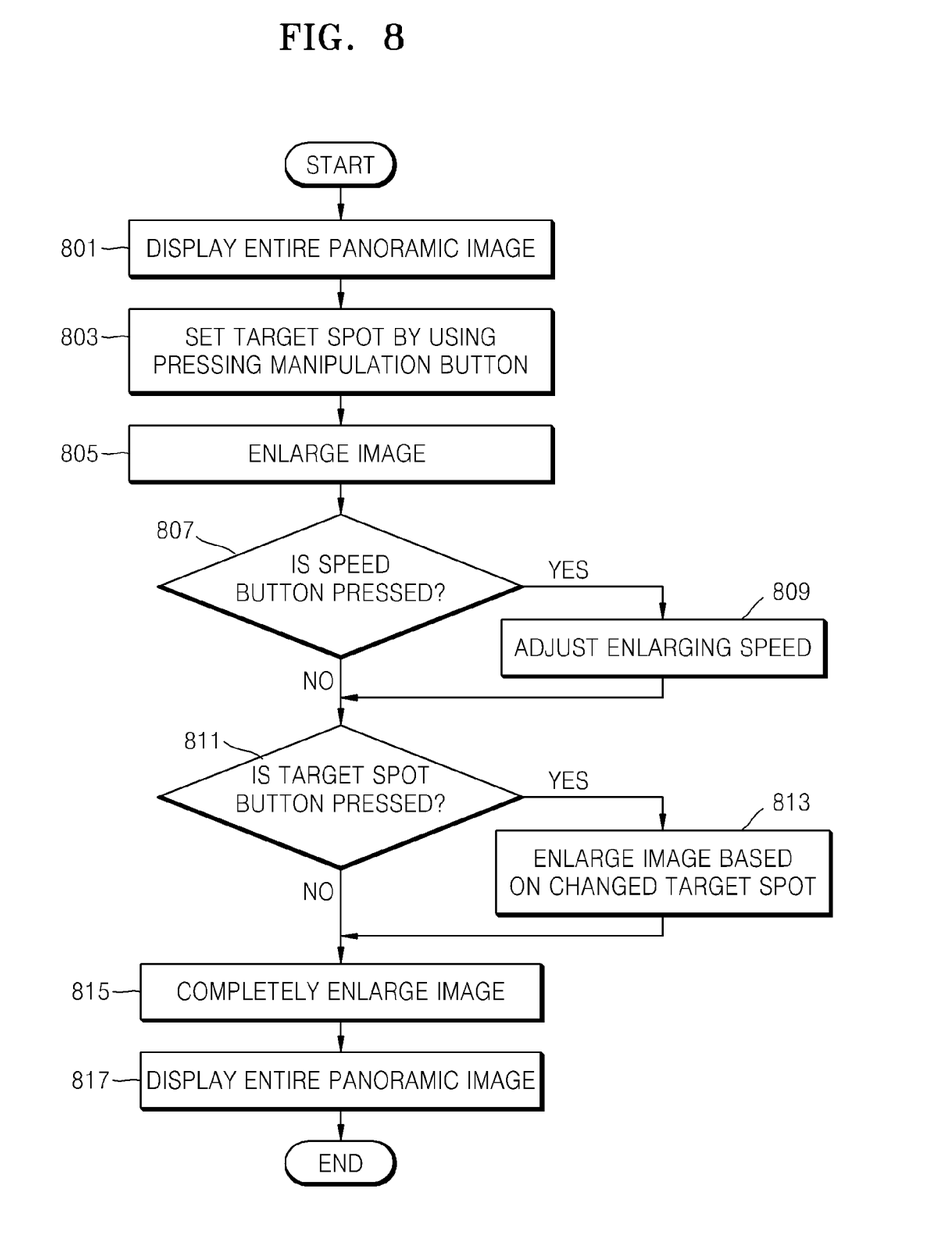
FIG. 8 is a flowchart of a method of controlling a digital photographing apparatus by pressing a button, according to another embodiment of the invention.

FIG. 8 is a flowchart of a method of controlling a digital photographing apparatus based on presses of buttons, according to another embodiment of the invention.

Referring to FIG. 8, the DSP 200 may display an entire panoramic image (operation 801). The panoramic image may be a horizontal or vertical panoramic image, as shown in (f-1) or (f-2) of FIG. 3F.

The DSP 200 receives a signal corresponding to any one of the up, the down, the right, the left and the OK buttons and sets a target spot (operation 803). Alternatively, the DSP 200 sets the target spot to a default target spot such as a center of the panoramic image.

The DSP 200 enlarges the panoramic image based on the set target spot (operation 805). The DSP 200 determines whether a speed adjustment signal is received (operation 807). When the speed adjustment signal is received, an image enlarging speed is adjusted (operation 809). With regard to a horizontal panoramic image, the image enlarging speed may be adjusted according to the up/down buttons. With regard to a vertical panoramic image, the image enlarging speed may be adjusted according to the right/left buttons. However, the present embodiment is not limited to these buttons.

The DSP 200 determines whether a target spot change signal is received (operation 811). When the target spot change signal is received, the image is enlarged based on a changed target spot (operation 813). With regard to a horizontal panoramic image, the target spot may be changed according to the right/left buttons. With regard to a vertical panoramic image, the target spot may be adjusted according to the up/down buttons. However, the present embodiment is not limited to these buttons.

The DSP 200 may completely enlarge the image at the changed image enlarging speed or based on the changed target spot (operation 815).

When the image is completely enlarged, the DSP 200 displays the entire panoramic image again (operation 817).

The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

As described above, according to one or more embodiments of the invention, when it may be difficult to identify a horizontal or vertical panoramic image on a display unit, the horizontal or vertical panoramic image may be more easily identified by selectively enlarging the horizontal or vertical panoramic image based on a selected target spot.

While exemplary apparatus, methods, and articles of manufacture have been particularly shown and described with reference to exemplary embodiments thereof, it will be understood by those of ordinary skill in the art that various changes in form and details may be made therein without departing from the spirit and scope of this disclosure.

What is claimed is:

1. A digital photographing apparatus comprising:
a digital signal processor configured to:
enlarge a panoramic image based on a first target spot set in the panoramic image;
display the enlarged image;
receive a target spot change signal indicating a change from the first target spot to a second target spot while the enlarged image is displayed, wherein the second target spot is different from the first target spot;
further enlarge the enlarged image based on the target spot change signal; and
display the further enlarged image at the second target spot.

2. The digital photographing apparatus of claim 1, wherein the digital signal processor is configured to enlarge the image in stages by as much as a size of a display unit displaying the image.

3. The digital photographing apparatus of claim 1, wherein the digital signal processor is configured to receive a touch signal, and to set the first target spot according to the touch signal.

4. The digital photographing apparatus of claim 3, wherein the digital signal processor is configured to enlarge the image in stages by as many as a number of touchings of the first target spot.

5. The digital photographing apparatus of claim 1, wherein the digital signal processor is configured to receive a signal corresponding to a predetermined button, and to set the first target spot according to the signal.

6. The digital photographing apparatus of claim 1, wherein the digital signal processor is configured to receive a manipulation signal while the image is enlarged, and to adjust an enlarging speed according to the manipulation signal.

7. The digital photographing apparatus of claim 1, wherein the digital signal processor comprises:
a setting unit configured to set a target spot in the image; and
an enlarging unit configured to enlarge the image based on the target spot.

8. The digital photographing apparatus of claim 7, further comprising a changing unit configured to generate a target spot change signal while the image is enlarged, and to output the target spot change signal to the enlarging unit.

9. The digital photographing apparatus of claim 7, further comprising a speed adjusting unit configured to adjust an enlarging speed.

10. The digital photographing apparatus of claim 1, wherein the digital signal processor is further configured to display the entire panoramic image after the panoramic image is completely enlarged.

11. A method of controlling a digital photographing apparatus, the method comprising:
receiving an indication of a first target spot in a panoramic image;
enlarging, using a processor, the panoramic image based on the target spot;
displaying the enlarged image;
receiving a target spot change signal indicating a change from the first target spot to a second target spot while the enlarged image is displayed, and further enlarging the enlarged image based on the target spot change signal, wherein the second target spot is different from the first target spot; and
displaying the further enlarged image at the second target spot.

12. The method of claim 11, further comprising:
receiving a manipulation signal while the image is enlarged; and
adjusting an enlarging speed of the panoramic image according to the manipulation signal.

13. The method of claim 11, further comprising enlarging the image in stages by as much as a size of a display unit for displaying the image.

14. The method of claim 11, further comprising
receiving a touch signal; and
setting the first target spot according to the touch signal.

15. The method of claim 14, further comprising enlarging the image in stages by as many as a number of touches of the first target spot.

16. The method of claim 11, further comprising:
receiving a signal corresponding to a predetermined button; and
setting the first target spot according to the signal.

17. The method of claim 11, further comprising displaying the entire panoramic image after the panoramic image is completely enlarged.

18. A non-transitory computer-readable storage medium storing instructions that, when executed, cause a machine to at least carry out the method of claim 11.

* * * * *